United States Patent
Kajita

(10) Patent No.: US 8,820,085 B2
(45) Date of Patent: Sep. 2, 2014

(54) LEAN FUEL INTAKE GAS TURBINE SYSTEM

(75) Inventor: Shinichi Kajita, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 927 days.

(21) Appl. No.: 12/993,398

(22) PCT Filed: Jun. 10, 2009

(86) PCT No.: PCT/JP2009/060595
§ 371 (c)(1),
(2), (4) Date: Nov. 18, 2010

(87) PCT Pub. No.: WO2009/151073
PCT Pub. Date: Dec. 17, 2009

(65) Prior Publication Data
US 2011/0067401 A1 Mar. 24, 2011

(30) Foreign Application Priority Data

Jun. 13, 2008 (JP) .................. 2008-154870
Apr. 28, 2009 (JP) .................. 2009-108999

(51) Int. Cl.
*F02C 1/06* (2006.01)
*F02C 7/08* (2006.01)
*F23R 3/40* (2006.01)
*F02C 3/22* (2006.01)

(52) U.S. Cl.
CPC ... *F02C 7/08* (2013.01); *F02C 3/22* (2013.01); *F23R 3/40* (2013.01); *F23R 2900/00002* (2013.01)
USPC ............... 60/723; 60/39.511; 60/736; 60/737

(58) Field of Classification Search
USPC ........ 60/39.5, 39.511, 723, 736–737, 39.281, 60/777
See application file for complete search history.

(56) References Cited

U.S. PATENT DOCUMENTS 4,754,607 A * 7/1988 Mackay .......................... 60/723
6,095,793 A * 8/2000 Greeb .............................. 431/12
(Continued)

FOREIGN PATENT DOCUMENTS

| EP | 0 271 360 A2 | 6/1988 |
| JP | A-63-186923 | 8/1988 |
| WO | WO 2004/029433 A1 | 4/2004 |

OTHER PUBLICATIONS

International Search Report in International Application No. PCT/JP2009/060595; dated Aug. 18, 2009 (with English-language translation).

(Continued)

*Primary Examiner* — Andrew Nguyen
(74) *Attorney, Agent, or Firm* — Oliff PLC

(57) ABSTRACT

Provided is a lean fuel sucking gas turbine system including a compressor for compressing a mixed gas having a fuel and air mixed to a concentration of an inflammable limit or lower, thereby producing a compressed gas, a first catalyst combustor for burning the compressed gas by a catalyst reaction, a turbine adapted to be driven by a combustion gas from a second catalyst combustor, and a reproducer for heating the compressed gas to be introduced into the first catalyst combustor with an exhaust gas from the turbine. Between the turbine and the reproducer, there is arranged a duct burner for flame-burning a first auxiliary fuel in the exhaust gas. Thus, it is possible to attain efficient operation of the system while simplifying the entire constitution and to prevent the blow-by of the mixed gas.

7 Claims, 3 Drawing Sheets

(56) References Cited

U.S. PATENT DOCUMENTS 6,269,625 B1 * 8/2001 Dibble et al. .................. 60/777
6,289,667 B1 * 9/2001 Kolaczkowski et al. ........ 60/777
6,313,544 B1   11/2001 Mongia et al.
6,960,840 B2   11/2005 Willis et al.

OTHER PUBLICATIONS

Ukrainian Office Action in Ukrainian Patent Application No. a201014737/M; dated Oct. 27, 2011.

* cited by examiner

LEAN FUEL INTAKE GAS TURBINE SYSTEM

TECHNICAL FIELD

The present invention relates to a lean fuel intake gas turbine system adapted for utilizing a burnable component contained in a mixturemixture as the fuel of this system by taking the mixturemixture into an engine of the system, wherein the mixturemixture is produced, for example, by mixing air with a low-calorie gas such as a landfill gas generated from a landfill site or the like and/or the so-called CMM (Coal Mine Methane) gas generated from a coal mine or the like, with the concentration of this mixture being controlled to be equal to or lower than a flammable limit so as to prevent such a mixture from being ignited inadvertently when it is compressed by a compressor of this system.

BACKGROUND ART

A gas turbine adapted for utilizing a methane component contained in the mixture as the fuel thereof by taking the gas into the engine thereof with the concentration of methane being controlled to be lower than the flammable limit has been known as a conventional technology. In the gas turbine of this type, the methane concentration is controlled to be within a range equal to or lower than the flammable limit by mixing a high-concentration methane gas, as needed, with the air containing a low-concentration methane gas. Then, this mixture is compressed by the compressor in order to produce a compressed gas. Thereafter, the compressed gas is combusted by a catalytic oxidation catalytic oxidation in a catalytic combustor in order to produce a combustion gas. In this manner, the turbine of this system can be driven by the so-produced combustion gas. Meanwhile, an exhaust gas discharged from the turbine is fed to a recuperatorrecuperator, whereby the compressed gas introduced into the catalytic combustor from the compressor can be heated (Patent Document 1: WO2004/029433A1). This gas turbine can utilize the low-calorie gas, such as the landfill gas and/or CMM gas, especially the so-called VAM (Ventilation Air Methane) gas, i.e., a ventilation exhaust gas generated from the coal mine, as the fuel thereof. Usually, this VAM gas is discharged or emitted into the air, because the methane concentration of this gas is equal to or lower than 1%, thus insufficient for allowing such a gas to be burned under normal burning conditions. Meanwhile, it is now attempted to get the right to emit carbon dioxide ($CO_2$) by achieving electric generation using the gas turbine that can utilize such a VAM gas as the fuel thereof.

However, in this gas turbine, the compressed gas supplied from the compressor is burned by the catalytic oxidation catalytic oxidation in the catalytic combustor. Therefore, the compressed gas supplied to the catalytic combustor should be heated, usually up to 300° C. or higher, and sometimes up to approximately 500° C., depending on the composition of the catalyst used. In particular, upon starting or during a low load operation of the gas turbine, the heating for the compressed gas performed only by the recuperatorrecuperator tends to be insufficient. Therefore, in such a case, it is necessary to further heat the compressed gas, such as by using an auxiliary heating system, e.g., a pre-combustor or the like. For instance, in the case of the above Patent Document 1, the pre-combustor is provided between the compressor and the catalytic combustor, wherein a propane gas or the like is supplied and burned in this pre-combustor with the pressure of this gas being elevated, thereby to heat the compressed gas before it is supplied to the catalytic combustor. However, in the case of using such an auxiliary heating system, the entire body of the gas turbine should be rather enlarged. In particular, in the case of the above Patent Document 1, it is necessary to further provide a fuel pressurizer adapted for pressurizing the fuel supplied to the pre-combustor up to a certain pressure needed at an outlet of the compressor, leading to substantial reduction of the net power actually used for the electric generation, thus degrading the energy efficiency.

Besides, in the case in which a part of the mixture extracted from the compressor is utilized for cooling high temperature parts, such as the turbine and the like, and/or utilized for shaft sealing, the methane gas contained in such a mixture is discharged to the outside, while being unreacted. That is, the so-called loss of the fuel gas will occur. In addition, such a loss of the fuel gas will also occur when the catalytic power or effect in the catalytic combustor is substantially degraded.

DISCLOSURE OF THE INVENTION

Therefore, it is an object of the present invention to provide the lean fuel intake gas turbine system that can be operated efficiently with the entire structure thereof being significantly simplified, while as well as can successfully prevent the aforementioned loss of the fuel gas.

To achieve the above challenge, the lean fuel intake gas turbine system of this invention includes: the compressor configured to compress the mixture produced by mixing the fuel (i.e., the burnable component) with the air and having the concentration equal to or lower than the flammable limit so as to produce the compressed gas; a first catalytic combustor configured to burn the compressed gas by the catalytic oxidation; the turbine configured to be driven with the combustion gas supplied from the first catalytic combustor; the recuperator configured to heat the compressed gas with the exhaust gas discharged from the turbine, while the compressed gas is introduced from the compressor into the first catalytic combustor; and a duct burner provided between the turbine and the recuperator and configured to burn a first auxiliary fuel by flame combustion in the exhaust gas.

According to this gas turbine system, the mixture of the concentration equal to or lower than the flammable limit is compressed by the compressor, and then the so-produced compressed gas is burned by the catalytic oxidation in the first catalytic combustor, whereby the turbine can be rotated by the high pressure combustion gas produced by the catalytic oxidation, thereby driving the load, such as the compressor, electric generator and the like. In the case in which the inlet temperature of the first catalytic combustor does not reach a certain or predetermined temperature for starting the catalytic oxidation (e.g., upon starting or during a partial-load operation of the turbine system), the first auxiliary fuel is supplied from the first auxiliary fuel supply unit to the duct burner located on the exhaust-gas side of the turbine, so that the temperature of the exhaust gas discharged from the turbine can be elevated by the flame combustion with the first auxiliary fuel. In this case, since the pressure of the exhaust gas is approximately the atmospheric pressure, the power required for elevating the pressure of the first auxiliary fuel is quite low. Then, the exhaust gas having been subjected to the temperature rising due to the flame combustion with the first auxiliary fuel is fed to the recuperator, where this exhaust gas is in turn subjected to heat exchange with the compressed gas supplied from the compressor toward the first catalytic combustor. As a result, the inlet temperature of the first catalytic combustor can be elevated by the compressed gas having been subjected to the temperature rising due to such heat exchange, thereby enabling adequate catalytic combustion in the first catalytic combustor. In this way, the gas turbine can be driven, even by using the mixture of such a low fuel concentration (or methane gas concentration) as seen in the landfill gas, CMM or VAM gas. Besides, the utilization of the catalytic oxidation can positively prevent generation of NOx. Further, unlike the related art, the gas turbine system of this invention does not use any auxiliary heating system, such as the pre-combustor or the like. Therefore, this gas turbine system can be operated with high efficiency, with the entire structure thereof being significantly simplified. Furthermore, the use of the methane gas fuel, such as the CMM or VAM gas or the like, can positively reduce the amount of the methane gas discharged into the air, thereby contributing to the prevention of warming the earth.

Preferably, the lean fuel intake gas turbine system of this invention further includes a second catalytic combustor provided between the duct burner and the recuperator. With this configuration, the temperature of the exhaust gas has only to be elevated by the combustion due to the duct burner up to such a temperature that can enable the catalytic combustion in the second catalytic combustor. Thus, the amount of the first auxiliary fuel of a relatively high concentration (or high quality) to be supplied to the duct burner can be substantially reduced. Further, in the case in which the extracted air or gas supplied from the compressor is utilized for cooling the high temperature parts, such as the turbine and the like, and/or utilized for the shaft sealing, the mixture, i.e., the extracted gas after used for such cooling and/or shaft sealing will be mixed into the exhaust gas flowed on the downstream side of the turbine. In addition, even when the catalytic power or effect in the catalytic combustor is substantially degraded, the mixture containing some amount of unreacted fuel will also be mixed with the exhaust gas. Then, such extracted and unreacted mixtures, respectively mixed into the exhaust gas, can be further combusted in the second catalytic combustor. Therefore, the loss of the fuel gas, i.e., the event that the mixture is discharged to the outside, while being unreacted or unused, can be securely prevented.

Preferably, the lean fuel intake gas turbine system of this invention further includes a second auxiliary fuel introducing unit provided between the duct burner and the second catalytic combustor and configured to introduce a second auxiliary fuel into the exhaust gas. With such introduction of the second auxiliary fuel to the exhaust gas flowed from the duct burner toward the second catalytic combustor, the amount of the high-concentration (or high quality) first auxiliary fuel to be supplied for the flame combustion in the duct burner can be substantially reduced. In this case, since the second auxiliary fuel is burned by the catalytic oxidation in the second catalytic combustor, the fuel of a relatively low concentration and low value can be used as this second auxiliary fuel.

Preferably, the lean fuel intake gas turbine system of this invention further includes a temperature sensor configured to detect the inlet temperature of the first catalytic combustor, and a fuel control unit configured to control at least a supply amount of the first auxiliary fuel so as to control the inlet temperature to be within a given range. With this configuration, at least the supply amount of the first auxiliary fuel can be controlled to securely set the inlet temperature within the given range, thereby substantially save the first auxiliary fuel.

Preferably, the lean fuel intake gas turbine system of this invention further includes a third auxiliary fuel introducing unit provided on the intake side of the compressor and configured to elevate the fuel concentration of the mixture by mixing third auxiliary fuel into the mixture. With this configuration, once the inlet temperature of the first catalytic combustor reaches the predetermined temperature during the starting operation, the third auxiliary fuel will be introduced from the third auxiliary fuel introducing unit in order to elevate the temperature of the combustion gas supplied to the turbine from the first catalytic combustor, thereby increasing the number of revolutions of the engine.

Preferably, the lean fuel intake gas turbine system of this invention further includes an air introducing unit provided on the intake side of the compressor and configured to lower the fuel concentration of the mixture by mixing air into the mixture. With this configuration, upon emergency stop of the engine, the air can be taken into the compressor from the air introducing unit provided on the intake side of the compressor, thereby lowering the fuel concentration of the mixture and thus adequately suppressing undue temperature rising in the catalytic combustor, leading to substantial shortening of the time required for stopping the engine.

Preferably, in the lean fuel intake gas turbine system of this invention, a catalyst for oxidizing the exhaust gas is provided along a wall face of each passage for the exhaust gas in the recuperator. Since this configuration can eliminate the need for providing the second catalytic combustor, the entire construction of the system can be further simplified.

Preferably, the lean fuel intake gas turbine system of this invention further includes a gas mixing passage configured to mix the mixture of the fuel and air into the exhaust gas discharged from the recuperator; a catalytic reactor configured to oxidize a fuel component contained in the exhaust gas mixed with the mixture by the catalytic oxidation; and a heat exchanger configured to heat the mixture flowing through the gas mixing passage with the oxidized exhaust gas discharged from the catalytic reactor. This configuration can successfully prevent generation of NOx, as well as can process a considerably great amount of the mixture, with significant reduction of the amount of the methane gas discharged to the outside, even in the case of using the low-methane-concentration gas, such as CMM, VAM or the like, as the mixture.

Effect Of The Invention

Therefore, according to the present invention, the lean fuel intake gas turbine system can be operated efficiently, with the entire structure thereof being significantly simplified, without requiring any additional heating system, such as the pre-combustor or the like, as provided in the related art.

BEST MODE FOR CARRYING OUT THE INVENTION

Hereinafter, several preferred embodiments will be described with reference to the drawings.

Figure 1:
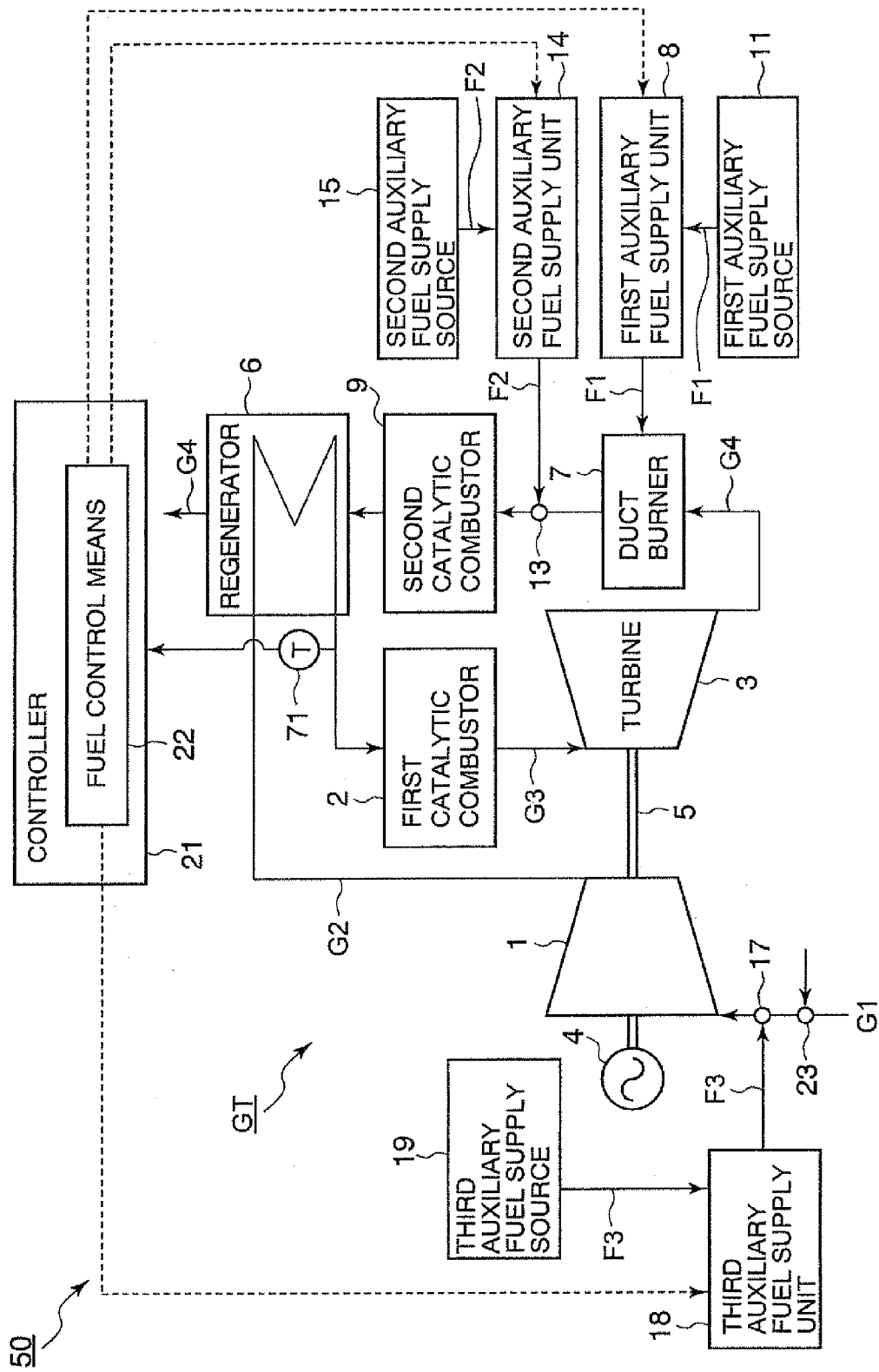
FIG. 1 is a schematic diagram illustrating a lean fuel intake gas turbine system of a first embodiment of the present invention.

First, as shown in FIG. 1, the lean fuel intake gas turbine GT according to the first embodiment of this invention includes the compressor 1, the first catalytic combustor 2 using the catalyst, such as platinum, palladium and/or the like, and the turbine 3. In this system, the mixture G1 of the air and fuel (i.e., the burnable component), such as the low-calorie gas, e.g., the landfill gas generated from the landfill site or the like, CMM and/or VAM gas generated from the coal mine or the like, is compressed in the compressor 1. Then, the resultant compressed gas G2 is fed to the first catalytic combustor 2 and combusted therein in the presence of the catalyst, such as platinum, palladium and/or the like. Thereafter, the high-pressure combustion gas G3 produced by such combustion is supplied to the turbine 3. As such, the turbine 3 can be driven. In this case, since the concentration (i.e., the burnable-component concentration) of the fuel contained in the mixture G1 is lower than the flammable limit, this gas G1 will not be ignited, even when compressed in the compressor 1. The turbine 3 is connected with the compressor 1 via a rotation shaft 5, such that the compressor 1 can be in turn driven by the turbine 3. Further, an electric generator 4, i.e., a kind of the load of this system, is driven by the output of the gas turbine system GT. In this manner, an electric generation system 50 including the gas turbine system GT is constructed. If required, the fuel concentration of the mixture G1 can be raised by appropriately adding the burnable component of a high concentration to the gas G1.

Further, the gas turbine system GT includes the recuperator 6 configured to heat the compressed gas G2 introduced from the compressor 1 into the first catalytic combustor 2, and a duct burner 7 provided between the turbine 3 and the recuperator 6 and configured to burn the exhaust gas G4. Specifically, the recuperator 6 can serve to heat the compressed gas G2 with the exhaust gas G4 discharged from the turbine 3, while the duct burner 7 can serve to burn the exhaust gas G4 by the flame combustion with the first auxiliary fuel F1. In this case, the first auxiliary fuel F1, such as a natural gas or the like that can be subjected to the flame combustion (or can be burned in a flame), can be supplied to the duct burner 7 from a first auxiliary fuel supply source 11 through the first auxiliary fuel supply unit 8 composed of, for example, a flow-control valve. Meanwhile, the exhaust gas G4 discharged from the recuperator 6 will be released into the air after silenced by a silencer (not shown).

Additionally, in the embodiment shown in FIG. 1, the second catalytic combustor 9 using the catalyst, such as platinum, palladium and/or the like, is provided between the duct burner 7 and the recuperator 6, and the second auxiliary fuel introducing unit 13, such as an injection nozzle or the like, configured to introduce the second auxiliary fuel F2 into the exhaust gas G4 is provided to an exhaust gas passage running between the second catalytic combustor 9 and the duct burner 7. In this case, the second auxiliary fuel F2, which is similar to the mixture G1, can be supplied to the second auxiliary fuel introducing unit 13 from a second auxiliary fuel supply source 15 through a second auxiliary fuel supply unit 14, such as the flow-control valve. Further, on the intake side of the first catalytic combustor 2, a first temperature sensor 71 configured to detect the temperature of the inlet (i.e., the inlet temperature) of the first catalytic combustor 2 is provided.

In addition, the fuel control means 22 is provided to a controller 21 configured to control the entire system. This fuel control means 22 can serve to receive a temperature detection signal inputted thereto from the first temperature sensor 71, and then output control signals to the first and second auxiliary fuel supply units 8, 14. More specifically, the fuel control means 22 outputs the control signals for respectively controlling the first and second auxiliary fuel supply units 8, 14, based on the temperature detected by the first temperature sensor 71, thereby to control the supply amount of each of the first and second auxiliary fuel F1, F2. In this way, the inlet temperature of the first catalytic combustor 2 can be kept constant (or within the predetermined range) in response to increase of the number of revolutions of the gas turbine system GT. In this case, however, the inlet temperature of the first catalytic combustor 2 may be controlled to be within the predetermined range by only controlling the amount of the fuel supplied from the first auxiliary fuel supply unit 8.

Further, the third auxiliary fuel introducing unit 17, such as the injection nozzle or the like, is provided to an intake passage located on the upstream side of the compressor 1. This third auxiliary fuel introducing unit 17 is provided for increasing the fuel concentration of the mixture G1 by mixing the third auxiliary fuel F3 into the mixture G1. Namely, in this case, the third auxiliary fuel F3, like the natural gas, having the fuel concentration (i.e., the methane concentration) higher than that of the mixture G1, can be supplied to the third auxiliary fuel introducing unit 17 from a third auxiliary fuel supply source 19 through a third auxiliary fuel supply unit 18, such as the flow-control valve. Again, the third auxiliary fuel supply unit 18 is controlled by the fuel control means 22 of the controller 21. With this configuration, once the inlet temperature of the first catalytic combustor 2 reaches the predetermined temperature, the third auxiliary fuel F3 can be supplied to be mixed with the mixture GI from the third auxiliary fuel supply unit 18, based on the output from the fuel control means 22, thereby to increase the number of revolutions of the gas turbine system GT.

Because each of the above first and second auxiliary fuel F1, F2 is introduced into the exhaust gas passage extending from the turbine 3 and kept at approximately the atmospheric pressure, the power required for pressurizing each of such fuel by using any proper fuel compressor is quite low. In addition, since the third auxiliary fuel F3 is pressurized by the compressor 1 of the gas turbine system GT, there is no need for providing any additional fuel compressor used for further pressurizing such fuel F3.

Furthermore, the air introducing unit 23, such as a control valve or the like, configured to mix the air A into the mixture G1 is provided to the intake passage on the upstream side of the compressor 1.

Namely, in the gas turbine system GT constructed as described above, the mixture G1 of the air and fuel containing the low-calorie gas, such as the landfill gas, CMM gas and/or the like, is first compressed in the compressor 1, and then the resultant compressed gas G2 is combusted by the catalytic oxidation in the first catalytic combustor 2. Thus, the turbine 3 can be rotated with the high-pressure combustion gas G3 produced by such combustion, thereby to drive the load, such as the compressor 1, the electric generator 4 and the like. In this case, upon starting the gas turbine system GT, the electric generator 4 is used as a starter, and serves to keep the number of revolutions of the gas turbine system GT at a small number.

When the number of revolutions of the gas turbine system GT is relatively small (e.g., upon starting the system GT and/or during the partial operation period of the load), and if the temperature detected by the first temperature sensor 71 provided on the intake side of the first catalytic combustor 2 does not reach the predetermined temperature (e.g., the temperature equal to or higher than 300° C.) at which the catalytic oxidation in the first catalytic combustor 2 can be started, the first auxiliary fuel F1 is supplied to the duct burner 7 provided on the exhaust-gas side of the turbine 3 from the first auxiliary fuel supply unit 8 based on the signal or command outputted from the fuel control means 22 of the controller 21. Then, with this supply of the first auxiliary fuel F1, the exhaust gas G4 discharged from the turbine 3 will be burned not by the catalytic combustion (or burning in the presence of the catalyst), but by the flame combustion. Thereafter, the exhaust gas G4 having experienced the flame combustion is fed to the recuperator 6, and is subjected therein to the heat exchange with the compressed gas G2 fed from the compressor 1 toward the first catalytic combustor 2. Thus, the temperature of the compressed gas G2 can be raised, thereby to elevate the inlet temperature of the first catalytic combustor 2, such that the catalytic combustion can be started therein.

In the duct burner 7, the temperature of the exhaust gas G4 has only to be elevated up to such a temperature that can enable the catalytic combustion in the second catalytic combustor 9. Therefore, the amount of the first auxiliary fuel F1 supplied to the duct burner 7 can be substantially reduced. If required, the low-calorie second auxiliary fuel F2, which is similar to the mixture G1, can be supplied to the exhaust gas passage from the second auxiliary fuel supply unit 14. Thus, the first auxiliary fuel F1 of a relatively high fuel concentration can be further saved.

Once the inlet temperature of the first catalytic combustor 2 detected by the first temperature sensor 71 reaches and exceeds the predetermined temperature during the starting operation of the gas turbine system GT, the third auxiliary fuel F having the fuel concentration higher than that of the mixture G1 will be supplied and mixed into the mixture G1 from the third auxiliary fuel supply unit 13, based on the output sent from the fuel control means 22. As a result, the temperature of the combustion gas G3 supplied from the first catalytic combustor 2 can be elevated, thereby increasing the number of revolutions of the gas turbine system GT.

Meanwhile, during the normal operation of the gas turbine system GT, the inlet temperature of the first catalytic combustor 2 is detected by the first temperature sensor 71, and then the amount of each of the first to third auxiliary fuel F1 to F3 respectively supplied from the first to third auxiliary fuel supply units 8, 14, 18 is controlled by the fuel control means 22, based on the detection result. Further, in response to the output of the gas turbine system GT, the inlet temperature of the first catalytic combustor 2 is controlled to be within the predetermined temperature range (e.g., 300° C. or higher). In this way, the catalytic combustion due to the first catalytic combustor 2 can be performed with high efficiency. In addition, for further control of the inlet temperature of the first catalytic combustor 2, the first or second auxiliary fuel F1 or F2 can be supplied to the exhaust gas passage, as needed, from the first auxiliary fuel supply unit 8 or second auxiliary fuel supply unit 14.

Further, upon the emergency stop of the gas turbine system GT, the air introducing port 23 provided on the intake side of the compressor 1 will be opened, as such the temperature of the mixture G1 can be lowered by introducing the air into the mixture G1 from the air introducing port 23. As a result, the temperature having been elevated so far by the combustion reaction in the first catalytic combustor 2 can be rapidly lowered, thereby substantially shortening the time required for completely stopping the operation of the gas turbine system GT.

Generally, in the gas turbine, the air extracted from the compressor is utilized for cooling the high temperature parts, such as the turbine and the like, and/or utilized for the shaft sealing, and then such extracted air after used for the cooling and/or shaft sealing will be mixed with the exhaust gas flowed on the downstream side of the turbine. Accordingly, in this embodiment, the mixture G1 after used for the cooling and/or shaft sealing will be mixed with the exhaust gas G4. Further, after mixed with the exhaust gas G4, the mixture G1 will be combusted in the second catalytic combustor 9. Therefore, the so-called loss of the fuel gas or methane gas (i.e., the event that the methane gas contained in the mixture G1 is discharged to the outside, while being unreacted or unused) can be successfully prevented. In addition, even when the catalytic power or effect in the first catalytic combustor 2 is substantially degraded, the fuel that may be discharged while being unreacted from such a first catalytic combustor 2 can be further combusted in the second catalytic combustor 9, thus further preventing the loss of the fuel gas.

As described above, since this embodiment does not use any heating system, such as the pre-combustor or the like, the gas turbine system GT can be operated with high efficiency with the entire structure thereof being significantly simplified, while the loss of the mixture can be successfully prevented.

Figure 2:
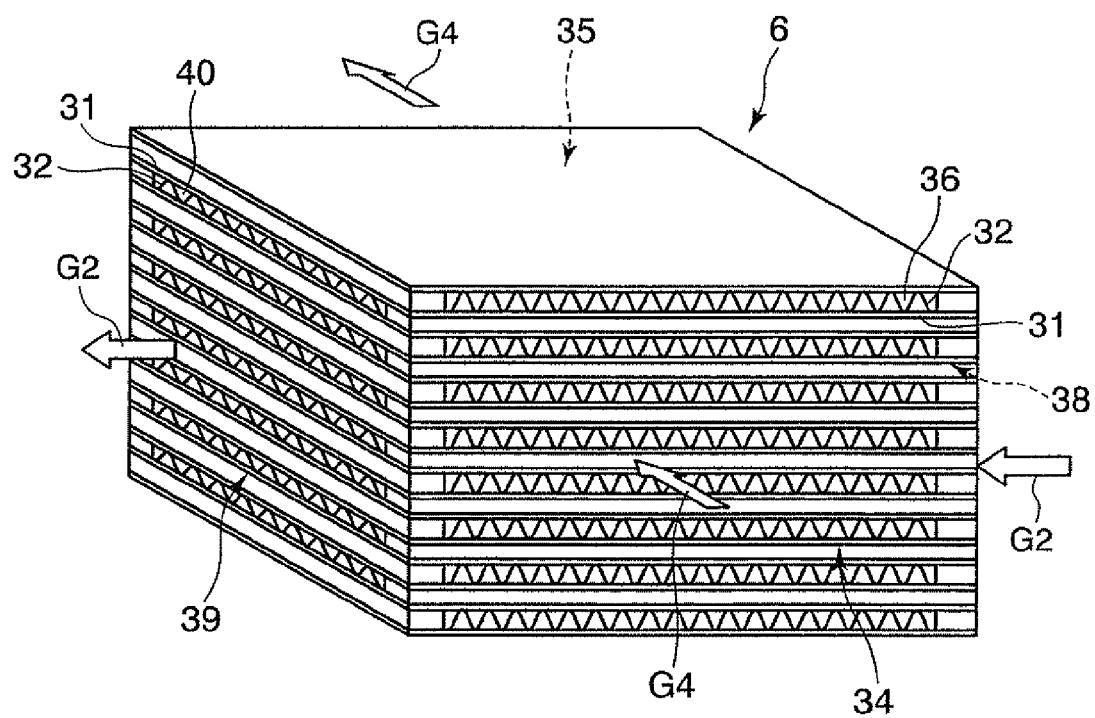
FIG. 2 is a perspective view of a recuperator for use in a second embodiment of the present invention.

FIG. 2 shows the recuperator 6 for use in the second embodiment of this invention, wherein this recuperator 6 can also be used as the second catalytic combustor 9. As shown in the drawing, this recuperator 6 is a plate-fin type heat exchanger composed of a plurality of plates 31 and fins 32, respectively stacked, alternately, one on another. A front face of the recuperator 6 can serve as an inlet 34 for the exhaust gas G4, while a rear face thereof can serve as an outlet 35 for the exhaust gas G4. In this case, a plurality of passages 36 for the exhaust gas G4 are arranged to respectively extend through the recuperator 6 from the front face to the rear face thereof. Further, a right side face of the recuperator 6 can serve as an inlet 38 for the compressed gas G2, while a left side face thereof can serve as an outlet 39 for the compressed gas G2. Namely, a plurality of passages 40 for the compressed gas G2 are arranged to respectively extend through the recuperator 6 from the right side face to the left side face thereof. Each fin 32 is composed of a corrugated plate, such that the passages 36, 40 can be formed, respectively, by each fin 32 disposed between two adjacent flat plates 31. More specifically, the passages 36 for the exhaust gas G4 and passages 40 for the compressed gas G2 are respectively arranged alternately in the vertical direction, while respectively extending orthogonally relative to one another.

Further, the wall face of each passage 36 for the exhaust gas G4 carries or contains the catalyst, such as platinum, palladium and/or the like, used for the catalytic oxidation for burning or combusting the exhaust gas G4. Because this configuration can eliminate the need for providing the second catalytic combustor 9 shown in FIG. 1, the entire structure of the gas turbine system GT can be further simplified.

Figure 3:
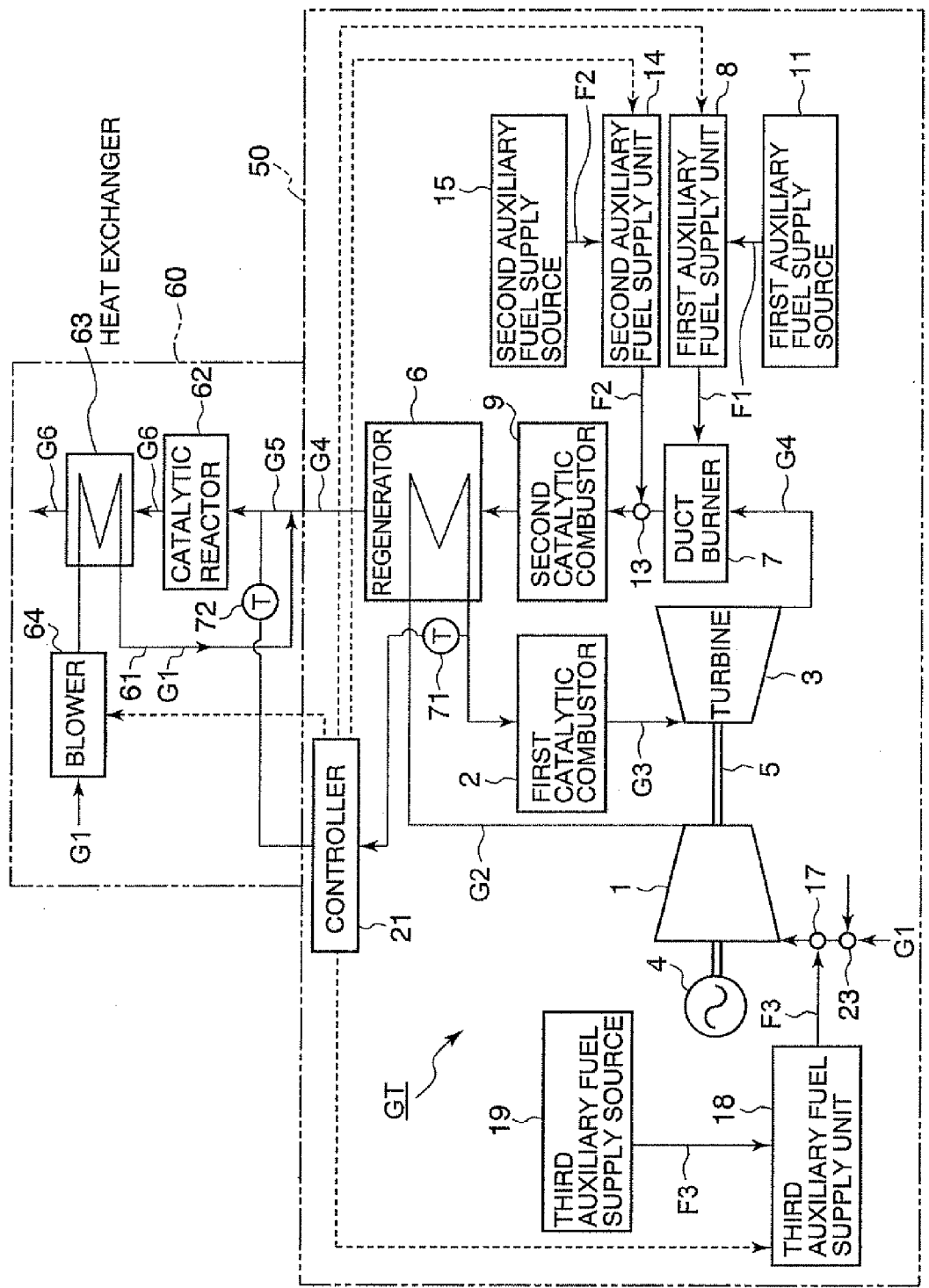
FIG. 3 is a schematic diagram illustrating a lean fuel intake gas turbine system of a third embodiment of the present invention.

FIG. 3 illustrates the third embodiment of this invention, wherein an oxidation unit 60 configured to oxidize the mixture G1 by utilizing the heat of the exhaust gas G4 discharged from the recuperator 6 is added to the electric generation system 50 of the above first embodiment shown in FIG. 1. This embodiment is intended for further reducing the discharge amount of the methane gas contained in the CMM or VAM gas into the air. The oxidation unit 60 includes the gas mixing passage 61 provided for mixing the mixture G1 containing the methane gas, such as the CMM or VAM gas, into the exhaust gas G4 discharged from the recuperator 6, the catalytic reactor 62 configured to oxidize by the catalytic oxidation the fuel component contained in a mixed exhaust gas G5 produced by mixing the mixture G1 into the exhaust gas G4, i.e., the fuel contained in the mixture G1, and the heat exchanger 63 configured to heat the mixture G1 flowed through the gas mixing passage 61 by utilizing an oxidized exhaust gas G6 discharged from the catalytic reactor 62. On the inlet side of the catalytic reactor 62, a second temperature sensor 72 configured to detect the inlet temperature of the catalytic reactor 62, i.e., the temperature of the mixed exhaust gas G5 produced by mixing the mixture G1 into the exhaust gas G4, is provided. In this case, a temperature detection signal is inputted from the second temperature sensor 72 to the controller 21 of the electric generation system 50, and then the controller 21 controls an amount of the air sent by a blower 64, based on the temperature of the mixed exhaust gas G5 detected by the sensor 72. In this manner, the amount of the mixture G1 to be mixed into the exhaust gas G4 can be controlled, thereby controlling the inlet temperature of the catalytic reactor 62 within a suitable range (e.g., 250 to 300° C.) for the catalytic oxidation. While the oxidation unit 60 of this embodiment is controlled by the controller 21 of the electric generation system 50, this oxidation unit 60 may be controlled by another exclusive controller provided separately from the controller 21.

In place of using the CMM or VAM gas, any other suitable gas can be used in this invention, provided that this gas is burnable or contains a proper amount of the burnable component.

As stated above, while the preferred embodiments have been shown and described, by way of example, it should be construed that various modifications and/or alterations can be made thereto within the scope of this invention.

The invention claimed is:

1. A lean fuel intake gas turbine system, comprising:
   a compressor configured to compress a mixture produced by mixing fuel with air and having a concentration equal to or lower than a flammable limit so as to produce a compressed gas;
   a first catalytic combustor configured to burn the compressed gas by a catalytic oxidation;
   a turbine configured to be driven with a combustion gas supplied from the first catalytic combustor;
   a recuperator configured to heat the compressed gas with an exhaust gas discharged from the turbine while the compressed gas is introduced from the compressor into the first catalytic combustor;
   a duct burner provided between the turbine and the recuperator and configured to burn the exhaust gas with a first auxiliary fuel by flame combustion;
   a gas mixing passage configured to mix the mixture of the fuel and air into an exhaust gas discharged from the recuperator;
   a catalytic reactor configured to oxidize a fuel component contained in the exhaust gas mixed with the mixture by a catalytic oxidation; and
   a heat exchanger configured to heat the mixture flowing through the gas mixing passage with an oxidized exhaust gas discharged from the catalytic is reactor.

2. The lean fuel intake gas turbine system according to claim 1, further comprising a second catalytic combustor provided between the duct burner and the recuperator.

3. The lean fuel intake gas turbine system according to claim 2, further comprising a second auxiliary fuel introducing unit provided between the duct burner and the second catalytic combustor and configured to introduce a second auxiliary fuel into the exhaust gas.

4. The lean fuel intake gas turbine system according to claim 1, further comprising a temperature sensor configured to detect an inlet temperature of the first catalytic combustor, and a fuel control unit configured to control at least a supply amount of the first auxiliary fuel so as to control the inlet temperature to be within a given range.

5. The lean fuel intake gas turbine system according to claim 1, further comprising a third auxiliary fuel introducing unit provided on an intake side of the compressor and configured to elevate a fuel concentration of the mixture by mixing a third auxiliary fuel into the mixture.

6. The lean fuel intake gas turbine system according to claim 1, further comprising an air introducing unit provided on an intake side of the compressor and configured to lower a fuel concentration of the mixture by mixing air into the mixture.

7. The lean fuel intake gas turbine system according to claim 1, wherein a catalyst for oxidizing the exhaust gas is provided along a wall face of a passage for the exhaust gas in the recuperator.

\* \* \* \* \*